(12) United States Patent
Koormann et al.

(10) Patent No.: US 8,936,264 B2
(45) Date of Patent: Jan. 20, 2015

(54) ONE-SHELL SPRING SUSPENSION ARM

(75) Inventors: Ralf Koormann, Leopoldshoehe (DE); Kai Haselhorst, Versmold (DE); Ronald Hertl, Bielefeld (DE)

(73) Assignee: Gestamp Umformtechnik GmbH, Bielefeld (DE)

( * ) Notice: Subject to any disclaimer, the term of this patent is extended or adjusted under 35 U.S.C. 154(b) by 0 days.

(21) Appl. No.: 13/983,108

(22) PCT Filed: Feb. 1, 2012

(86) PCT No.: PCT/EP2012/051680
§ 371 (c)(1),
(2), (4) Date: Oct. 14, 2013

(87) PCT Pub. No.: WO2012/104345
PCT Pub. Date: Aug. 9, 2012

(65) Prior Publication Data
US 2014/0300074 A1    Oct. 9, 2014

(30) Foreign Application Priority Data

Feb. 2, 2011 (DE) .......................... 10 2011 000 462

(51) Int. Cl.
*B60G 7/02* (2006.01)
*B60G 7/00* (2006.01)
(Continued)

(52) U.S. Cl.
CPC ................ *B60G 7/001* (2013.01); *B60G 11/16* (2013.01); *B60G 13/005* (2013.01);
(Continued)

(58) Field of Classification Search
CPC ........... B60G 7/001; B60G 2204/1244; B60G 2204/12; B60G 2206/10; B60G 2206/72; B60G 2206/722; B60G 2206/8104

USPC .................................. 280/124.151, 124.134
See application file for complete search history.

(56) References Cited

U.S. PATENT DOCUMENTS

| 3,797,852 | A | * | 3/1974 | Patterson et al. | ...... 280/124.151 |
| 4,170,373 | A | * | 10/1979 | Beck et al. | ............ 280/124.141 |
| 7,261,307 | B2 | * | 8/2007 | Nuno et al. | ............ 280/124.151 |
| 7,959,171 | B2 | * | 6/2011 | Takahashi et al. | ..... 280/124.151 |

FOREIGN PATENT DOCUMENTS

| DE | 10261210 A1 | 7/2004 |
| DE | 102004008957 A1 | 9/2005 |

(Continued)

OTHER PUBLICATIONS

Josef Kraus, "Gewichts-Und Kostenreduzierung Durch Hochfeste Stahle Im Fahrwerk", Feb. 3, 2009, http://www.innovations-report.de/html/berichte/maschinenbau/gewichts-kostenreduzierung-hochfeste-staehle-126591.wihtm? English translation attached—"Weight and cost reduction through the high-strength steel in the chassis", Feb. 3, 2009.

*Primary Examiner* — Drew Brown
(74) *Attorney, Agent, or Firm* — The Webb Law Firm

(57) ABSTRACT

The invention relates to a one-shell spring suspension arm formed of sheet metal for a wheel suspension of a motor vehicle, including a first end section for connection to a chassis carrier, a second end section for wheel-side connection, and a width-expanded section for supporting a spring, which is arranged between the two end sections and defines a trough having upwardly projecting flanks. In order to enable optimized wheel suspension by distributing the forces and torques to spatially distanced connections, or articulated-connection points, while achieving a relatively low component weight and favorable manufacturing costs, the invention provides that a spiral is integrally formed in the width-expanded section of the spring suspension arm as a spring seat and that a connection section for connecting a shock absorber is formed between the spiral and the second end section.

11 Claims, 2 Drawing Sheets

(51) Int. Cl.
*B60G 11/16* (2006.01)
*B60G 13/00* (2006.01)

(52) U.S. Cl.
CPC .. *B60G 2204/1244* (2013.01); *B60G 2206/162* (2013.01); *B60G 2200/142* (2013.01); *B60G 2204/12* (2013.01); *B60G 2206/10* (2013.01); *B60G 2206/72* (2013.01); *B60G 2206/722* (2013.01); *B60G 2206/8104* (2013.01)
USPC .................................................. 280/124.151

(56) References Cited

FOREIGN PATENT DOCUMENTS

| | | |
|---|---|---|
| DE | 102006032595 A1 | 1/2008 |
| DE | 102009012551 A1 | 9/2010 |
| EP | 1642754 A1 | 4/2006 |
| EP | 2062754 A2 | 5/2009 |
| JP | 2002274133 A | 9/2002 |
| JP | 2008024158 A | 7/2008 |

* cited by examiner

ONE-SHELL SPRING SUSPENSION ARM

CROSS-REFERENCE TO RELATED APPLICATIONS

This application is the United States national phase under 35 U.S.C. §371 of International Application No. PCT/EP2012/051680 filed Feb. 1, 2012 entitled "One-Shell Spring Suspension Arm", and claims priority under 35 U.S.C. §119(a)-(d) to German Patent Application No. 10 2011 000 462.9, filed on Feb. 2, 2011 in the German Intellectual Property Office, the disclosures of which are hereby incorporated by reference in their entirety.

The invention relates to an one-shell spring suspension arm formed of sheet metal for a wheel suspension of a motor vehicle, comprising a first end section for connection to a chassis carrier, preferably a rear axle carrier, a second end section for wheel-side connection, and a width-expanded section for supporting a spring, which section is arranged between the two end sections and defines a trough having upwardly projecting flanks. The invention further relates to a multi-link rear axle for a motor vehicle, comprising a rear axle carrier and wheel carriers articulated thereto, the respective wheel carrier being articulated to the rear axle carrier via a spring suspension arm.

Spring suspension arms serve to guide a chassis wheel on a wheel suspension of a motor vehicle. They comprise a section for supporting a spring or a spring shock absorber arrangement which is in turn supported against the vehicle body.

During driving operation, spring suspension arms are often subjected to high, alternating loads. If the spring suspension arm is not sufficiently rigid, widening or deformation of the spring suspension arm may occur, in particular in the region of the spring support. So as to make high loading possible in the region of the spring support, current, known spring suspension arms are provided with one or more reinforcing, additional metal sheets. For example, as reinforcing metal sheets, cup-shaped shells are inserted into the width-expanded section of the spring suspension arm in the region of the spring support. Furthermore, multi-shell spring suspension arms are known comprising a closing metal sheet which encloses the spring in the region of the spring support and which is welded to the two flanks of a trough-shaped spring suspension arm shell.

DE 10 2004 008 957 A1 discloses a spring suspension arm for a wheel suspension, which is formed from a spring suspension arm shell having a substantially U-shaped profile, the U-shaped profile comprising, at an open side, two sickle-shaped metal bridge sheets which are arranged on either side of the spring support face and which are fixed to the spring suspension arm shell by riveting, screwing or welded connections.

The manufacture and incorporation of the additional shells or closing and bridging metal sheets requires corresponding manufacturing steps, and this is unfavourable as regards the manufacturing costs. In addition, known multi-shell spring suspension arms often have a relatively high component weight as a result of the reinforcing additional metal sheets thereof.

DE 10 2006 032 595 A1 discloses a generic one-shell spring suspension arm, the spring suspension arm shell of which is formed in a single piece and comprises an outwardly protruding ring face as a spring seat in the region of the width-expanded section. For better centering of the spring, an inwardly directed elevation is provided within the ring face and is provided with a central opening. This one-shell spring suspension arm is of a relatively low component weight by comparison with the known multi-shell spring suspension arms. In the manufacture thereof, manufacturing steps are omitted which are required in the multi-shell spring suspension arms for manufacturing and incorporating the additional closing and bridging metal sheets.

The object of the present invention is to provide a spring suspension arm of the type mentioned at the outset, which makes an optimal wheel suspension possible by way of a distribution of the forces and moments onto connection or articulation points which are at a distance in space, and in particular offers improved resilience properties, at a relatively low component weight and favourable manufacturing costs.

This object is achieved according to the invention by a spring suspension arm having the features of claim 1.

The one-shell spring suspension arm according to the invention is characterised in that a spiral is integrally formed in the width-expanded section thereof as a spring seat, and in that a connection section for connecting a shock absorber is formed between the spiral and the second end section.

As a result of the integrated spiral, a more favourable spring support is achieved which is distinguished by a force or load introduction distributed over a relatively large support region. At the same time, by way of the spiral, advantageous reinforcement of rigidity can be achieved in the region of the spring support, making it possible to manufacture the spring suspension arm as an one-shell component without closing metal sheets or other reinforcing additional sheets. Formed on the spring suspension arm at a distance from the spiral in space, the connection section makes a more uniform distribution of the forces and moments possible over the spring suspension arm and over the associated vehicle construction, resulting in an improved wheel suspension overall.

The bottom of the trough-shaped, width-expanded section of the spring suspension arm connects the upwardly projecting flanks of the trough. The spring seat which is provided in the spiral is thus formed continuously, that is to say substantially without interruption.

In an advantageous embodiment of the spring suspension arm according to the invention, the spiral is formed in such a way that the lowest point thereof is in an angular range of at most 90°, preferably at most 60°, the angle bisector of which extends perpendicular to the longitudinal central axis of the spring suspension arm. This embodiment is advantageous with regard to manufacture. In particular, as a result, overexpansion of the metal sheet during the shaping of the spring suspension arm or the spiral can be reliably prevented.

The contact face (spring support face) between the spring and the base of the spring suspension arm preferably extends over a spiral region of at least 180°, preferably at least 210°, and particularly preferably at least 240°. As a result, a very uniform input of force into the spring suspension arm and thus a high strength of the spring suspension arm are achieved while using relatively little material. At the same time, this leads to a reduction in weight and a reduced constructional volume.

In accordance with a further advantageous embodiment of the spring suspension arm according to the invention, a section of the spiral comprises an arc-shaped bead which starts at a distance in space from the lowest point of the spiral and extends towards the highest point of the spiral. The bead enlarges the contact area between the spring and the spring suspension arm and thus evens out the introduction of force into the spring suspension arm. In addition, the bead improves the rigidity of the spring suspension arm in the region of the spring support. In the case where a spring seat insert is used, the bead provides corresponding fixing and orientation.

In accordance with a further embodiment of the invention, the spring suspension arm according to the invention is manufactured from sheet metal which has a yield point of at least 500 MPa, preferably of at least 650 MPa.

A further advantageous embodiment of the spring suspension arm according to the invention involves the flanks of the width-expanded section extending continuously as far as the second end section and defining a fork-shaped mounting section for connecting a wheel carrier and for connecting the shock absorber, the fork-shaped mounting section delimiting a niche-shaped recess which extends from the second end section at least as far as the connecting section which serves to connect the shock absorber. As a result of the connection of the shock absorber at the flanks of the trough-shaped spring suspension arm shell, the rigidity of the spring suspension arm is further improved. The recess provided in the fork-shaped mounting section, which extends at least as far as the connection section which serves for connecting the shock absorber, reduces the component weight of the spring suspension arm.

For the rigidity of the relatively lightweight spring suspension arm, it is further advantageous if, in accordance with a further preferred embodiment of the invention, flange-shaped, mutually facing collars or bends are formed on the fork-shaped mounting section and delimit the niche-shaped recess.

In a further advantageous embodiment of the spring suspension arm according to the invention, the spiral thereof surrounds an opening (hole opening) at which an inwardly projecting Collar is formed. The collar serves as a centering projection for the coil spring which is supported on the spring suspension arm. At the same time, the collar improves the rigidity of the spring suspension arm. The collar is preferably annular in form.

A further advantageous embodiment of the spring suspension arm according to the invention is characterised in that the connection section for connecting the shock absorber comprises mutually flush openings which are arranged inside mutually opposing beads which open towards the upper side of the spring suspension arm. These beads not only improve the rigidity of the spring suspension arm, but also, if they have the corresponding shape and dimensions, facilitate the assembly of a mounting core of the shock absorber. Preferably, the flank distance of each of these beads gradually increases from the lower end thereof to the upper side of the spring suspension arm. In this case, these beads comprise a substantially parabolic flank.

A further advantageous embodiment of the spring suspension arm according to the invention involves the flanks of the width-expanded section extending continuously as far as the first end section of the spring suspension arm and define a fork-shaped mounting section for connecting the spring suspension arm to a chassis support, preferably a rear axle support, the fork-shaped mounting section comprising mutually flush openings having collars for receiving a bearing bush and delimiting a niche-shaped recess which extends in the direction of the spring seat by a depth which is greater than the diameter, preferably greater than twice the diameter, of the collars serving to support the bearing bush. These collars, which may also be referred to as rim holes, are preferably directed inwards, that is to say facing one another. The relatively deep niche-shaped recess in the direction of the spring seat in turn reduces the component weight of the spring suspension arm. For the rigidity of the spring suspension arm, it is further advantageous if, in accordance with a further preferred embodiment, flange-shaped, mutually facing collars or bends which delimit the niche-shaped recess are formed at this fork-shaped bearing portion.

In a further embodiment of the spring suspension arm according to the invention, at least one opening for connecting a level sensor may be formed on at least one of the flanks of the trough-shaped spring suspension arm shell or on at least one collar which is outwardly angled thereon. The level sensor is for example part of a device for automatic light range adjustment of the headlights and/or of a device for chassis level adjustment.

In the following, the invention is explained in greater detail by way of drawings showing an embodiment, in which.

Figure 1:
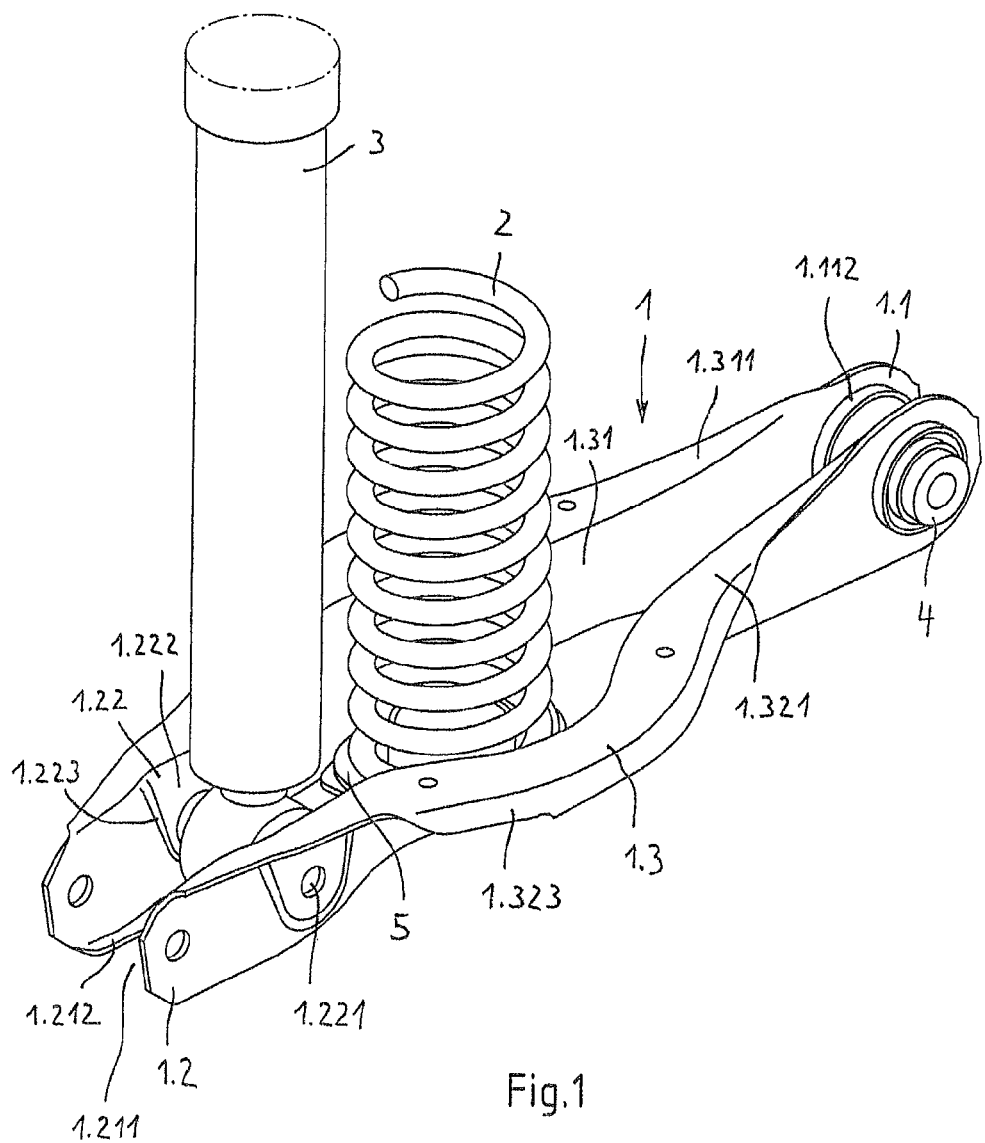
FIG. 1 is a perspective view of a spring suspension arm according to the invention comprising a spring which is supported thereon, a shock absorber arranged at a distance therefrom in space, and a bearing bush.

In the drawings, a spring suspension arm 1 for a wheel suspension of a motor vehicle is shown. The spring suspension arm 1 is manufactured as an one-shell component from a metal plate by deformation. The spring suspension arm 1 is a deep-drawn part. It is substantially manufactured by deep drawing. The spring suspension arm 1 comprises a first end section 1.1 for connection to a chassis carrier, preferably a rear axle carrier, and a second end section 1.2 for connection to a wheel carrier. A width-expanded section 1.3 for supporting a spring (coil spring) 2 is formed between the two end sections 1.1, 1.2.

The spring suspension arm 1 consists of high-strength sheet metal, preferably sheet steel. The sheet metal or sheet steel which is used for its manufacture has a yield point of more than 650 MPa.

The width-expanded section 1.3, which carries the spring 2, of the spring suspension arm 1 is formed substantially trough-shaped. The flanks 1.31, 1.32 of the trough project upwards with respect to the bottom 1.33 thereof. A spiral 1.34, by means of which an improved spring support is achieved, is integrally formed in this section as a spring seat. Within the spiral 1.34, an opening 1.35 is cut out, on which an inwardly or upwardly projecting collar 1.36 is formed as a rim hole. The collar (rim hole) 1.36 is formed annularly and projects into the coil springs 2 and forms a spring centering means.

The bottom 1.33 of the trough connects the upwardly projecting flanks 1.31, 1.32 of the spring suspension arm 1. The spring seat which is provided in the spiral 1.34 is thus uninterrupted in form, as is shown in particular in FIG. 2.

The spiral 1.34 is formed in such a way that the lowest point 1.341 thereof is in an angular range of at most 90°, preferably at most 60°, the angle bisecting line of which extends perpendicular to the longitudinal central axis M of the spring suspension arm 1. Preferably, the lower end of the helical spring 2 ends approximately in the cross-sectional plane which extends perpendicular to the longitudinal central axis M of the spring suspension arm 1, where the width-expanded spring suspension arm section 1.3 has its greatest width. A section of the spiral 1.34 is provided with an arc-shaped bead 1.342, which starts at a distance in space from the lowest point 1.341 of the spiral 1.34 and extends in the direction of the highest point 1.343 of the spiral 1.34. The bead 1.342 preferably ends at or close to the highest point 1.343 of the spiral 1.34.

The flanks 1.31, 1.32 of the width-expanded section 1.3 extend continuously as far as the end section 1.2 on the wheel carrier side. They define a fork-shaped mounting section 1.21 for connecting a wheel carrier.

The spring suspension arm 1 further comprises a connection section 1.22 for connecting a shock absorber 3. This connecting section 1.22 is formed at a distance in space between the spiral 1.34 which serves as a spring seat and the end section 1.2 of the spring suspension arm on the wheel carrier side. The section 1.22 for connecting the shock absorber 3 is also positioned at the fork-shaped mounting section 1.21 which serves for connecting the wheel carrier. It comprises mutually flush openings 1.221, which are arranged inside mutually opposing beads 1.222 which open towards the upper side of the spring suspension arm 1. From the upper side of the spring suspension arm 1, the flanks 1.223 of the respective bead 1.222 approach one another towards the underside thereof, and merge into one another in an arc shape below the opening 1.221.

The fork-shaped mounting section 1.21 delimits a niche-shaped section 1.211 which starts between the spiral 1.34 and the connection section 1.22 for connecting the shock absorber 3 and opens at the end section 1.2 on the wheel carrier side. Flange-shaped, mutually facing bends or collars 1.212 are formed on the fork-shaped mounting section 1.21 and delimit the longitudinal sides of the niche-shaped recess 1.211.

It can further be seen that the flanks 1.31, 1.32 of the width-expanded section 1.3 of the spring suspension arm also extend continuously as far as the end section 1.1 with which the spring suspension arm 1 is articulated to a rear axle carrier or another chassis carrier. There, the flanks 1.31, 1.32 in turn define a fork-shaped mounting section 1.11 which comprises mutually flush openings 1.111 having collars 1.112 for receiving a bearing bush 4, preferably a rubber-metal mounting. The collars 1.112 are manufactured as passages of the openings 1.111 and orientated inwards, that is to say towards one another.

The end section 1.1 of the spring suspension arm 1 which is associated with a rear axle carrier likewise comprises a niche-shaped recess 1.12, which opens into the end of the spring suspension arm 1 which is present there. The longitudinal sides of the recess 1.12 are delimited by flange-like bends or collars 1.113 which are formed on the fork-like mounting section 1.11. The recess 1.12 extends from the end of the spring suspension arm 1 in the direction of the spring seat at a depth which is greater than twice the diameter of the opening 1.111 serving for receiving the bearing bush 4.

The flanks 1.31, 1.32 of the trough-shaped, one-shell spring suspension arm 1 are bent outwards in a flank-like manner at the upper side thereof as collars 1.311, 1.321. These collars 1.311, 1.321 each extend continuously between the two end sections 1.1, 1.2 and preferably extend from the connection portion 1.2 on the wheel carrier side as far as the fork-shaped mounting section 1.11 at the other end of the spring suspension arm 1. The collars 1.311, 1.321 are additionally bent downwards in the region of the expanded portion 1.3 of the spring suspension arm 1, in such a way that they comprise a substantially horizontal first section 1.312, 1.322 and an outer section 1.313, 1.323 connected thereto which extends substantially vertically or perpendicular thereto.

Figure 2:
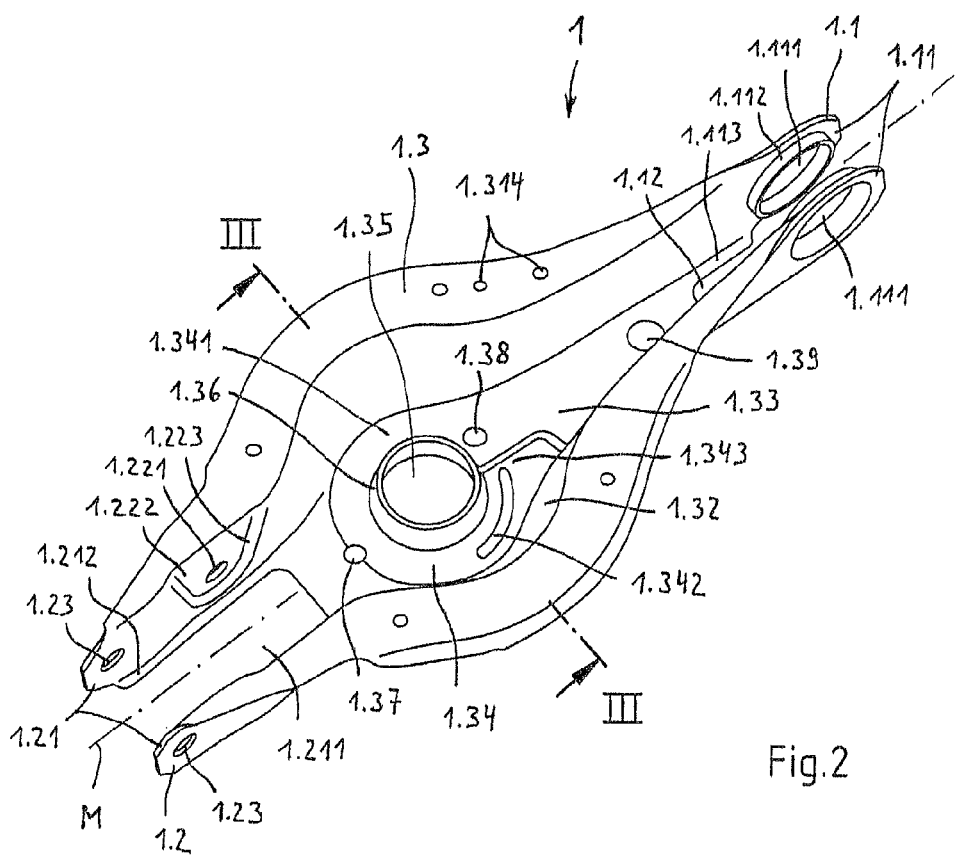
FIG. 2 is a perspective plan view of the spring suspension arm of FIG. 1 without the spring, the shock absorber and the bearing bush.
Figure 3:
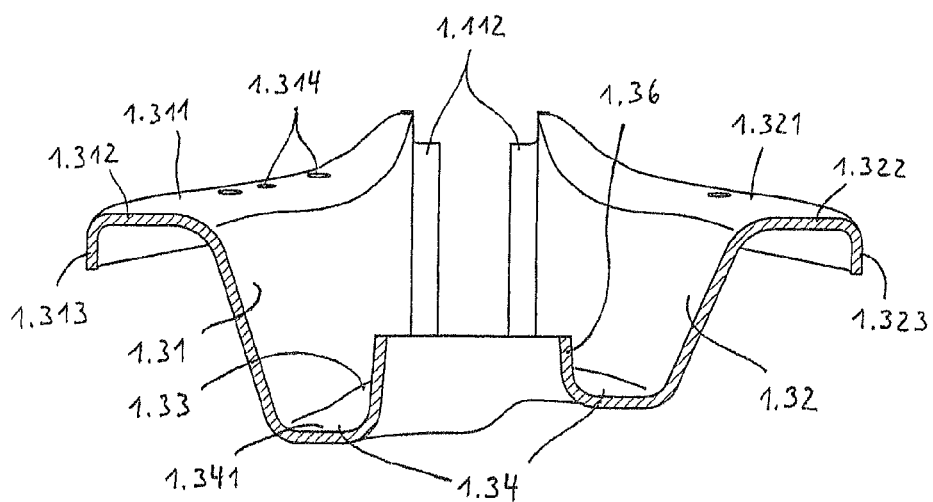
FIG. 3 is a cross-sectional view of the spring suspension arm along the section line in FIG. 2.

As can be seen in particular from FIG. 2, one or more openings 1.314 for connecting a level sensor (not shown) are formed on at least one of the flanks 1.31 or on at least one of the collars 1.311 which are outwardly angled thereon.

A bead 1.342 and an opening 1.37 are incised in the base 1.33 of the trough-shaped spring suspension arm shell, and serve for fixing and orientating a spring seat insert 5 made of rubber or plastics material. The insert 5 optimises the spring support. The insert 5 is an optional part of the spring suspension arm 1. Also, at least one opening 1.39 may be provided in the base 1.33 of the spring suspension arm shell for reducing the weight of the spring suspension arm 1. The opening 1.38 serves as a dirt or water runoff.

The spring suspension arm 1 according to the invention is distinguished by a low component weight and favourable manufacturing costs, and offers an optimised wheel suspension by distributing the forces and moments over connection or articulation points which are at a distance in space. It is suitable in particular for a multi-link rear axle.

The design of the spring suspension arm according to the invention is not limited to the embodiment shown in the drawings. Rather, a large number of variants are conceivable, which make use of the invention as specified in the claims even in a design differing from the embodiment shown. So, for example, the flush openings 1.23 for connection on the wheel carrier side could also for example be in the form of rim holes. Further, it is also within the scope of the invention to connect a stabiliser (not shown) to the shock absorber 3, which is arranged separated from the coil spring 2 in space, via a pendulum support (coupling rod).

The invention claimed is:

1. A one-shell spring suspension arm formed of sheet metal for a wheel suspension of a motor vehicle, comprising a first end section for connection to a chassis carrier, a second end section for wheel-side connection, and a width-expanded section for supporting a spring, which is arranged between the two end sections and defines a trough having upwardly projecting flanks, wherein a spiral is integrally formed in the width-expanded section as a spring seat, wherein a connection section for connecting a shock absorber is formed between the spiral and the second end section, wherein the spiral is formed in such a way that the lower point thereof is in an angular range of at most 90°, the angle bisector of which extends perpendicular to the longitudinal central axis of the spring suspension arm, wherein the spiral surrounds an opening at which an inwardly projecting collar is formed, wherein the sheet metal of the spring suspension arm has a yield point of at least 500 MPa, and wherein a section of the spiral comprises an arc-shaped bead which starts at a distance in space from the lowest point of the spiral and extends towards the highest point of the spiral.

2. The spring suspension arm according to claim 1, wherein the lower point of the spiral is in an angular range of at most 60°, the angle bisector of which extends perpendicular to the longitudinal central axis of the spring suspension arm.

3. The spring suspension arm according to claim 1, wherein the flanks of the width-expanded section extend continuously as far as the second end section and define a fork-shaped mounting section for connecting a wheel carrier and for connecting the shock absorber, the fork-shaped mounting section delimiting a niche-shaped recess which extends from the second end section at least as far as the connection section which serves for connecting the shock absorber.

4. The spring suspension arm according to claim 3, wherein flange-shaped, mutually facing collars or bends are formed on the fork-shaped mounting section and delimit the niche shaped recess.

5. The spring suspension arm according to claim 1, wherein the connection section for connecting the shock absorber comprises mutually flush openings which are arranged inside mutually opposing beads which open toward the upper side of the spring suspension arm.

6. The spring suspension arm according to claim 5, wherein the flank distance of each of the beads gradually increases from the lower end thereof to the upper side of the spring suspension arm.

7. The spring suspension arm according to claim 1, wherein the flanks of the width-expanded section extend continuously, as far as the first end section, and define a fork-shaped mounting section for connecting the spring suspension arm to the chassis carrier, the fork-shaped mounting section comprising mutually flush openings having collars for receiving a bearing bush and delimiting a niche-shaped recess which extend in the direction of the spring seat by a depth which is greater than the diameter, preferably of the collars serving to support the bearing bush.

8. The spring suspension arm according to claim 7, wherein flange-shaped, mutually facing collars or bends are formed on the fork-shaped mounting section and delimit the niche-shaped recess.

9. The spring suspension arm according to claim 1, wherein at least one opening for connecting a level sensor is formed on at least one of the flanks or on at least one collar which is outwardly angled thereon.

10. The spring suspension arm according to claim 1, wherein the sheet metal thereof has a yield point of at least 650 MPa.

11. A multi-link rear axle for a motor vehicle, comprising a rear axle carrier and wheel carriers articulated thereto, wherein the respective wheel carrier is articulated to the rear axle carrier via a spring suspension arm according to claim 1.

* * * * *